(12) United States Patent
Santamarina et al.

(10) Patent No.: US 11,060,855 B2
(45) Date of Patent: Jul. 13, 2021

(54) ANGLE OF REPOSE SYSTEM AND METHOD

(71) Applicant: KING ABDULLAH UNIVERSITY OF SCIENCE AND TECHNOLOGY, Thuwal (SA)

(72) Inventors: Juan Carlos Santamarina, Thuwal (SA); Marisol Salva Ramirez, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 0 days.

(21) Appl. No.: 16/848,440

(22) Filed: Apr. 14, 2020

(65) Prior Publication Data

US 2020/0340804 A1 Oct. 29, 2020

Related U.S. Application Data

(60) Provisional application No. 62/837,866, filed on Apr. 24, 2019.

(51) Int. Cl.
| | | |
|---|---|---|
| *B66F 9/00* | (2006.01) | |
| *G01B 11/26* | (2006.01) | |
| *G01N 15/14* | (2006.01) | |
| *G01N 15/02* | (2006.01) | |
| *G01B 11/08* | (2006.01) | |

(52) U.S. Cl.
CPC ............. *G01B 11/26* (2013.01); *G01B 11/08* (2013.01); *G01N 15/0227* (2013.01);
(Continued)

(58) Field of Classification Search
CPC ........ G01B 11/26; G01B 11/08; G01B 21/22; B65D 88/62; B22F 7/02; G01N 19/02; G01N 1/20; G01N 15/0227; G01N 15/1463; G01N 11/00; G01N 15/00; G01N 2033/0091; G01N 2015/144; G01N 2015/1497; G01N 2011/006; G01N 11/04; G01N 2015/1493; G01F 11/003;
(Continued)

(56) References Cited

U.S. PATENT DOCUMENTS

| | | | | |
|---|---|---|---|---|
| 3,940,997 A | * | 3/1976 | Hudson | ................... G01N 11/00 73/866 |
| 2005/0109160 A1 | * | 5/2005 | Brent | ...................... G01N 19/04 75/380 |
| 2016/0249038 A1 | * | 8/2016 | Mosleh | ................ H04N 5/2258 |

OTHER PUBLICATIONS

Roscoe, K., et al.; "On the Yielding of Soils,"; Géotechnique, vol. 8, Issue 1; Mar. 1958; pp. 22-53.
(Continued)

*Primary Examiner* — Mesfin T Asfaw
(74) *Attorney, Agent, or Firm* — Patent Portfolio Builders PLLC

(57) ABSTRACT

A system for measuring an angle of repose includes an angle of repose device that holds a granular material, and a portable smart device having a camera and a processor. The angle of repose device is configured to open a slit to allow a first part of the granular material to remain in an upper chamber while a second part of the granular material moves freely, due to gravity, from the upper chamber to a lower chamber. The portable smart device uses the camera to take a digital image of the first part and the second part of the granular material and uses an app installed on the processor to calculate an internal angle of repose and an external angle of repose.

20 Claims, 19 Drawing Sheets

(52) U.S. Cl.
CPC ... *G01N 15/1463* (2013.01); *G01N 2015/144* (2013.01); *G01N 2015/1493* (2013.01); *G01N 2015/1497* (2013.01)

(58) Field of Classification Search
CPC .......... G01F 1/30; G01F 15/14; G01F 11/261; C30B 15/02; B65G 25/02; A61K 9/2018; F16K 13/02; C09D 7/62; E01C 13/02
See application file for complete search history.

(56) References Cited

OTHER PUBLICATIONS

Cho, G.-C., et al., "Particle Shape Effects on Packing Density, Stiffness, and Strength: Natural and Crushed Sands," Journal of Geotechnical and Geoenvironmental Engineering, May 2006, vol. 132, Issue 5, Issue 5, pp. 591-602.

Rodriguez, J.M., et al., "Particle Shape Determination by Two-Dimensional Image Analysis in Geotechnical Engineering," Proceedings of Nordic Conference on Soil Mechanics and Geotechnical NGM, Copenhagen: Danish Geotechnical Society , Sep.-Dec. 2012, p. 207-218.

Santamarina, J.C., et al., "Friction in Granular Media," in Meso-Scale Shear Physics in Earthquake and Landslide Mechanics, edited by Hatzor, Y.H., et al., 2010, pp. 159-190.

Zheng, J., et al., "Traditional Soil Particle Sphericity, Roundness and Surface Roughness by Computational Geometry," Geotechnique, Sep. 1, 2015, Issue 65, No. 6, pp. 494-506.

\* cited by examiner

TABLE 1

| Sample | Mineralogy | Particle Size [mm] |
|---|---|---|
| Ottawa sand 20/30 | Quarzitic sand | 0.6-0.85 |
| KAUST sand 20/30 | Carbonate sand | 0.95 |
| KAUST sand fine | Carbonate sand | 0.41-0.70 |
| KAUST sand coarse | Carbonate sand | 1.0-2.0 |
| Glass beads coarse | Silica | 0.18-0.3 |
| Glass beads fine | Silica | 0.1-0.2 |
| Reef Carbonate sand | Carbonate sand | 3.0-0.05 |
| Beach sand | Quarzitic sand | 0.4-1.0 |
| Silt-Silica Flour | Silica | 0.04-0.1 |
| Diatom Pellets | Silica | 1.0-2.0 |
| Rabigh lagoon sand | Carbonate sand | 0.4-0.7 |
| Al Wajh sand | Carbonate sand | 0.5-1.2 |
| Jazan sand | Carbonate sand | 0.2-3 |

FIG. 1

$$D_a = \frac{2\sqrt{A}}{\pi}$$

TABLE 2

| Sample | Grain size distribution | | Packing density | | Specific gravity |
|---|---|---|---|---|---|
| | Coefficient of uniformity $C_u$ | Mean grain size $D_{50}$ [mm] | $e_{max}$ | $e_{min}$ | |
| Ottawa sand 20/30 | 1.4 | 0.65 | 0.742 | 0.530 | 2.65 |
| KAUST sand 20/30 | 1.4 | 0.65 | 0.674 | 0.555 | 2.65 |
| KAUST sand fine | 1.3 | 0.50 | 0.724 | 0.585 | 2.65 |
| KAUST sand coarse | 1.6 | 1.30 | 0.779 | 0.570 | 2.65 |
| Glass beads coarse | 1.4 | 0.60 | 0.742 | 0.555 | 2.5 |
| Glass beads medium | 1.1 | 0.21 | 0.808 | 0.538 | 2.5 |
| Reef Carbonate sand | 2.2 | 0.45 | 1.700 | 1.357 | 2.79 |
| Glass beads fine | 1.1 | 0.16 | 0.917 | 0.716 | 2.65 |
| Silt-Silica Flour | - | - | 1.442 | 0.641 | 2.65 |
| Diatom Pellets | 1.7 | 1.20 | 2.965 | 2.670 | 2.32 |
| Rabigh lagoon sand | 1.8 | 0.23 | 0.947 | 0.633 | 2.81 |
| Al Wajh sand | 1.6 | 0.60 | 1.429 | 1.133 | 2.75 |
| Jazan sand | 39 | 0.05 | 1.348 | 0.889 | 2.58 |

FIG. 12A

TABLE 2

| Sample | Particle shape | | Angle of repose | | | |
|---|---|---|---|---|---|---|
| | Roundness R | Sphericity S | Internal mean [°] | St. dev [°] | External mean [°] | St. dev [°] |
| Ottawa sand 20/30 | 0.52 | 0.80 | 33.33 | 0.00 | 27.35 | 0.05 |
| KAUST sand 20/30 | 0.60 | 0.88 | 38.87 | 0.22 | 33.63 | 1.26 |
| KAUST sand fine | 0.41 | 0.81 | 41.94 | 0.93 | 36.42 | 1.27 |
| KAUST sand coarse | 0.44 | 0.74 | 37.88 | 0.00 | 31.94 | 0.80 |
| Glass beads coarse | 0.48 | 0.96 | 29.53 | 0.47 | 29.86 | 0.61 |
| Glass beads medium | 0.69 | 0.94 | 25.99 | 0.01 | 24.31 | 0.00 |
| Reef Carbonate sand | 0.25 | 0.81 | 44.46 | 6.74 | 26.40 | 2.09 |
| Glass beads fine | 0.66 | 0.95 | 38.28 | 1.01 | 27.85 | 2.89 |
| Silt-Silica Flour | - | 0.67 | 72.99 | 2.01 | 37.67 | 0.58 |
| Diatom Pellets | 0.59 | 0.54 | 42.00 | 3.00 | 33.21 | 1.38 |
| Rabigh lagoon sand | 0.51 | 0.76 | 32.76 | 3.80 | 27.98 | 3.91 |
| Al Wajh sand | 0.35 | 0.69 | 54.29 | 1.60 | 31.90 | 0.93 |
| Jazan sand | 0.24 | 0.85 | 31.15 | 0.24 | 21.91 | 0.47 |

FIG. 12B

ANGLE OF REPOSE SYSTEM AND METHOD

CROSS-REFERENCE TO RELATED APPLICATIONS

This application claims priority to U.S. Provisional Patent Application No. 62/837,866, filed on Apr. 24, 2019, entitled "ANGLE OF REPOSE," the disclosure of which is incorporated herein by reference in its entirety.

BACKGROUND

Technical Field

Embodiments of the subject matter disclosed herein generally relate to a system and method for determining an angle of repose of a given material, and more particularly, to calculating both an external and internal angle of repose that correspond to different failure mechanisms.

Discussion of the Background

Granularity is the condition of a material existing in granules or grains, and refers to the extent to which the material or system is composed of distinguishable pieces. In this context, coarse grains are critical to a wide variety of engineering projects. Common locations at which coarse grain materials are present include alluvial deposits close to the rivers, hydraulic fills, eolian deposits like desert sand dunes, carbonate platforms, coastal environments, and other natural and artificial settings. Knowing the structure of the material at these sites and also their properties is not only desired by those that explore or maintain such systems, but also necessary. Coarse grains are particularly relevant to the mining, oil and construction industries.

The coarse grains can be described by a couple of parameters, as the particle size, shape, packing density, and angle of repose. The particle size is an inherent sediment scale. Gravimetric and skeletal forces control the behavior and interaction between the grains due to their size (>75 µm). The size and shape of the grains that make up the material reflect the grain formation history. Chemical and biological processes determine the size and shape of the fine sediments while various mechanical processes determine these properties in coarse-grained soils.

Shape parameters and packing densities control the behavior of the coarse-grained soils. Image analysis techniques and simple laboratory tests can provide measurements of these index properties and result in reasonable estimates of the mechanical parameters. Understanding frictional behavior at the level of the grains is a fundamental part of engineering design and is essential to the process for determining the strength parameters of the various materials used by the engineers at the construction jobs. The angle of repose is a measurement of the critical state friction angle of sands. Shear strength parameters, which are related to the angle of repose, describe the mechanical response of the soils, determine the bearing capacity of foundations, and the resistive forces in slope stability or excavation analysis.

However, the existing methods for measuring the angle of repose do not provide an accurate estimate. Thus, there is a need for a new method and a new device for more accurately estimating the angle of repose for a given material.

BRIEF SUMMARY OF THE INVENTION

According to an embodiment, there is a system for measuring an angle of repose. The system includes an angle of repose device that holds a granular material and a portable smart device having a camera and a processor. The angle of repose device is configured to open a slit to allow a first part of the granular material to remain in an upper chamber while a second part of the granular material moves freely, due to gravity, from the upper chamber to a lower chamber. The portable smart device uses the camera to take a digital image of the first part and the second part of the granular material and uses an app installed on the processor to calculate an internal angle of repose and an external angle of repose.

According to another embodiment, there is an angle of repose device for measuring an angle of repose, and the device includes a box that holds a granular material, and a first plate that is configured to slide and open a slit to allow a first part of the granular material to remain in an upper chamber while a second part of the granular material moves freely, due to gravity, from the upper chamber to a lower chamber. The first part of the granular material forms a first slope that corresponds to an internal angle of repose and the second part of the granular material forms a second slope that corresponds to an external angle of repose.

According to yet another embodiment, there is a method for measuring an angle of repose, and the method includes placing granular material inside an angle of repose device, forming a gap in a support of the granular material, allowing a first part of the granular material to remain in an upper chamber while a second part of the granular material moves freely, due to gravity, from the upper chamber to a lower chamber, taking a digital image of the first part and the second part of the granular material, calculating an internal angle of repose for the first part, and calculating an external angle of repose for the second part.

BRIEF DESCRIPTION OF THE DRAWINGS

For a more complete understanding of the present invention, reference is now made to the following descriptions taken in conjunction with the accompanying drawings, in which:

FIG. 1 is a table that illustrates sample names, related mineralogy, and particle size ranges;

FIGS. 12A and 12B summarize the results obtained with the methods discussed herein for the various parameters of the granular material.

DETAILED DESCRIPTION OF THE INVENTION

Figure 2A:
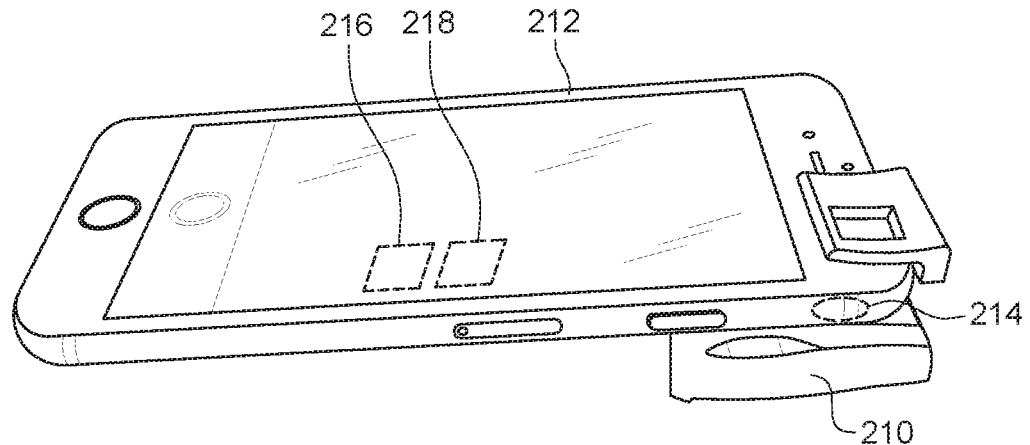
FIG. 2A illustrates a 3D-printed microscope attached to a smartphone.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a system and method that determines the angle of repose for a sand. However, the embodiments to be discussed next are not limited to determining the angle of repose only for a sand, but they may be applied to other materials.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel method and system for determining an angle of repose includes a transparent box having a rectangular geometry that is configured to hold the material that is desired to be analyzed. A sliding plate, which holds the material, can be displaced to form a slot or opening having a desired size. Part of the material that is present inside the box would fall through the opening so that the material that remains on the plate forms an interior slope and the fallen material forms an exterior slope. A mobile electronic device, for example, a smartphone, can be used to calculate, using its camera, the interior slope and the exterior slope and then calculate the associated angles of repose for the given material. An app may be embedded into the smartphone and configured to run all these measurements. The app may be also configured to align a horizontal line from the digital image with a true horizontal line of the cellphone, to avoid distortions due to perspective and measures of the angle by binarizing the image and applying a threshold and measure the angle between the boundaries.

To better understand the link between the angle of repose and the other properties of the material to be studied, first the physics of size, shape, packing densities, and critical state parameters is discussed, with various experiments and implementations, the relationships between these factors are examined, and a set of tools to facilitate their characterization is then discussed within the concept of "Lab-on-a-Bench". The embodiments discussed herein extend beyond Terzaghi-style laboratories and combine cutting-edge sensors, concepts, and a mobile app into compact devices (e.g., a smartphone) with effective laboratory protocols.

For the following discussion, 13 different materials with different sizes and shapes, which include a variety of natural sands, glass beads, diatom pellets, and silica flour, were discussed. These various materials are illustrated in Table 1, in FIG. 1. Table 1 summarizes the mineralogy and particle size ranges for the various materials. The grain size distribution curves, packing densities, particle shape and critical state parameters were measured for these materials and the results were compared with published data as discussed later. For all the samples, the material was washed with distilled water and oven-dried before the analysis.

Measurement of particle size in coarse-grained sediments can involve sieving, sedimentation, laser diffraction, and particle image analysis. Sieving is the oldest and most popular technique. Laser diffraction and sedimentation use the Stokes equation to calculate the equivalent particle size based on the velocity of the particle and assume spherical particles. Sedimaging is a new methodology that obtains the grain size distribution by a process of particle sorting within a sedimentation column using image analysis. This sorting by size permits statistical image analysis based on wavelet transformation.

Image analysis techniques include Feret and equivalent diameters. Open-source software like ImageJ facilitates the implementation of this technique in different contexts that extend from medical imaging to geotechnical applications.

Figure 2B:
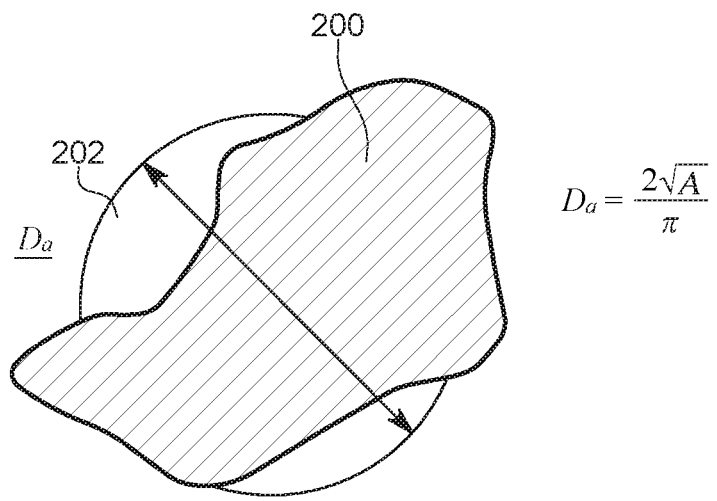
FIG. 2B illustrates an equivalent area diameter for grain size distribution.

In this embodiment, the concept of Lab-on-a-Bench was used, which employs microscopy and image analysis techniques to determine the grain size distribution of coarse-grained sediments. The technique utilizes a smartphone attached to a microscope, for example, a 3D-printed microscope, which are combined with an algorithm that can be implemented, for example, into a mobile app. The app may be configured to use the equivalent diameter $D_a = 2\sqrt{A/\pi}$ to provide these measurements. FIG. 2A shows the 3D-printed microscope 210 placed over a digital camera 214 of a smartphone 212 while FIG. 2B illustrates the equivalent diameter $D_a$ applied to a grain 200. Note that the smartphone 212 also includes a processor 216 and a memory 218 for storing and processing the recorded digital images. FIG. 2B illustrates that the given grain 200 is considered to have a spherical equivalent shape 202, with a diameter $D_a$ so that the area of the actual grain 200 and the area of the spherical shape 202 are the same.

The 3D-printed microscope 210 attached to the smartphone 212 uses the backscatter of the flash to illuminate the sample. In one embodiment, the printing material is ABS, but other materials may also be used. An aluminum foil at the end of the microscope scatters the light emitted from the flash and illuminates the sample. An extra phone lens functions as an additional magnification and provides micron-scale resolution.

Figure 3:
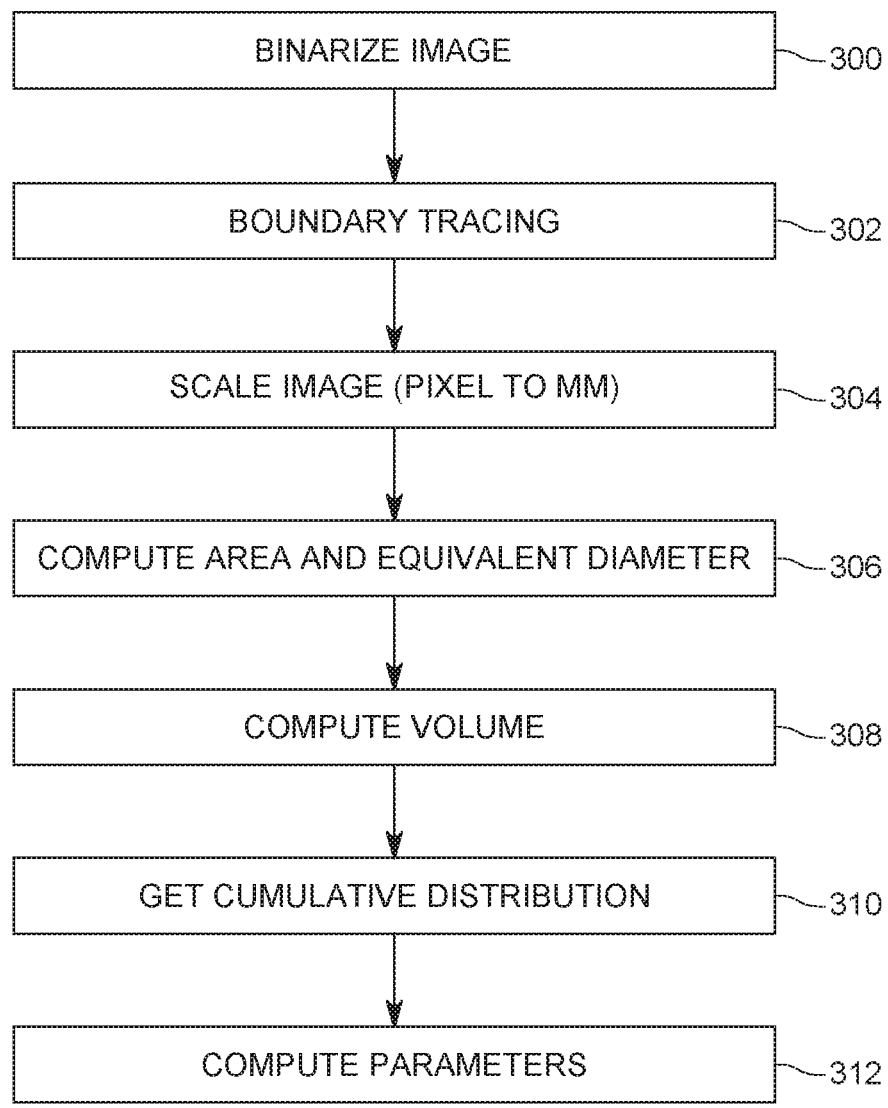
FIG. 3 is a flowchart of a method for calculating a grain size distribution of a granular material.

An algorithm for computing the grain size of the grain 200 may be implemented in Matlab, in the smartphone 212. The method, which is schematically illustrated in FIG. 3, includes a step 300 of creating a binary image by applying a threshold, a step 302 of differentiating each particle boundary, a step 304 of scaling the image, a step 306 of computing the area and the equivalent diameter $D_a$, a step 308 of calculating the volume by assuming spherical particles and using the equivalent diameter $D_a$, a step 310 of obtaining the cumulative distribution function, and a step 312 of plotting the grain size distribution curve and computing the mean grain size ($D_{50}$) and coefficient of uniformity ($Cu = D_{60}/D_{10}$).

Figure 4:
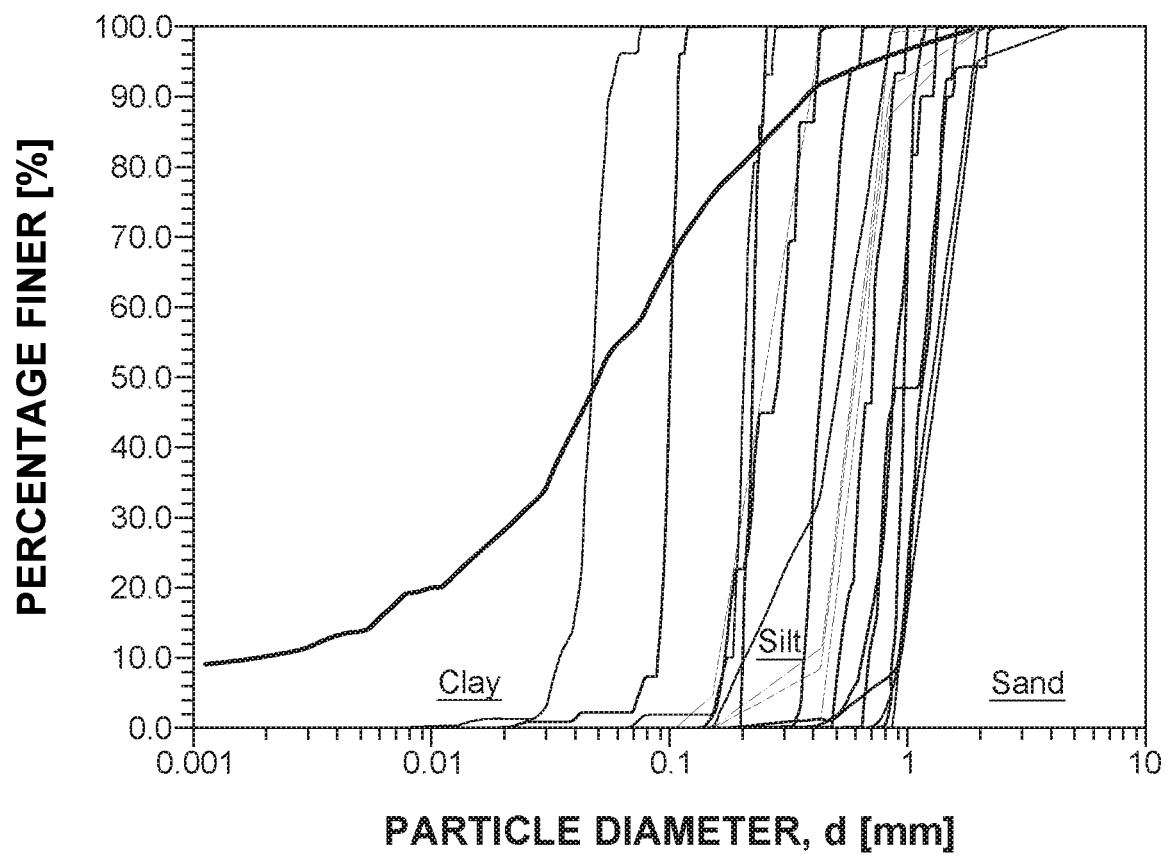
FIG. 4 illustrates grain size distribution curves obtained with the method illustrated in FIG. 3.

Calibration samples included glass beads coated with silver paint that range from 200 to 215 μm diameter, glass beads with 180 to 300 ƒm diameter, KAUST fine sand, and KAUST coarse sand. FIG. 4 shows the grain size distribution curves obtained with the app noted above, based on the method illustrated in FIG. 3.

Figure 5A:
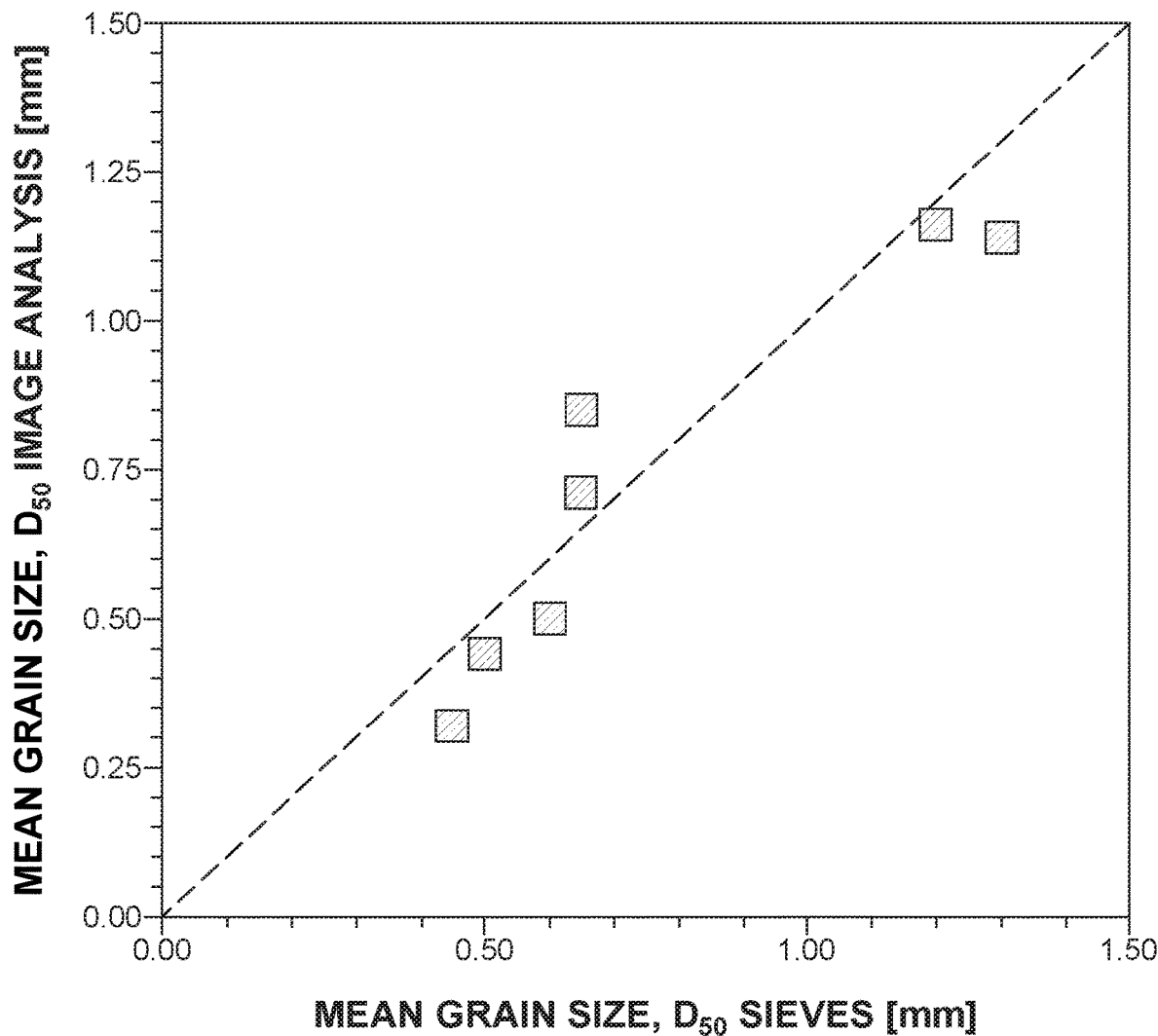
FIG. 5A compares the $D_{50}$ data obtained using an image based method with the data obtained by the traditional sieve analysis and FIG. 5B compares the Cu data obtained using the image based method and the traditional sieve analysis.
Figure 5B:
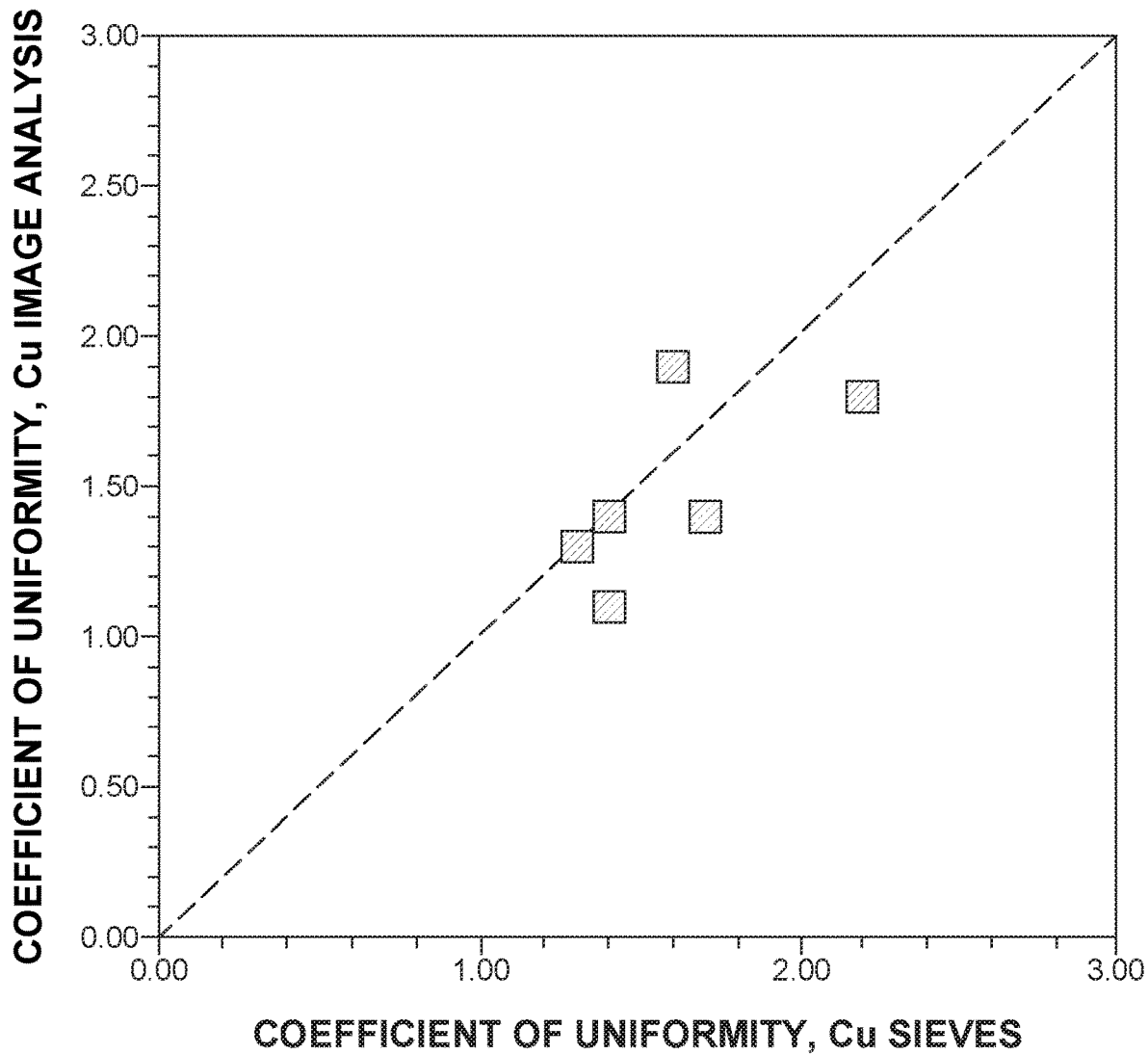

Particle size distribution is one of the most important parameters in soil behavior. The relevance of electrical and capillary contact forces increases as particle size and effective stress decrease. The results produced by the inventors indicate that these image analysis techniques can accurately measure the particle size distribution in coarse-grained soils. In this regard, FIGS. 5A and 5B show a comparison between parameters (Cu and $D_{50}$) determined with sieves based methods versus parameters obtained using the image analysis illustrated in FIG. 3. These results agree with previous studies where the Feret diameter is also commonly used. Automated measurements performed with the smartphone 212 are faster than traditional sieving (from 30 minutes for one sample to just a few minutes with the imaging technique) and are less expensive than laser diffraction.

The relative grain size also influences the porosity of the material. The coefficient of uniformity Cu shown in FIG. 5B and the volume fraction of fine and coarse grains highlight changes in porosity values. These changes in porosity are relevant to clogging, fines migration, filtering design and have an impact on the permeability and compressibility of the sediment. The Revised Soil Classification System RSCS captures all of the relationships listed above and also includes the influence of particle shape effects.

Another parameter of the grains is their shape. Previous studies extensively focused on the calculation of particle shape. Significant contributions to the field include the roundness index and sphericity using standard shape comparison, rapid visual methods, chart comparisons for roundness and sphericity, angularity, Fourier analysis techniques combined with digital images, convexity, the aspect ratio, and computational geometry.

A limitation of using particle shapes for sediment characterization is the large number of different definitions for the same terms (e.g., roundness and sphericity) and parameters (e.g., the aspect ratio, Fourier descriptors, circularity, angularity, convexity, roundness, roughness, and texture), which typically result in confusion.

Traditional analysis techniques typically use visual chart based comparisons, which can be time-consuming and tedious, e.g., roundness and sphericity. Most published correlations use these conventional methods. By contrast, the new digital image analysis techniques discussed herein rely on different shape parameters without many established correlations. There have been attempts to automate traditional methods, e.g., roundness and sphericity, but not with much success.

Figure 6:
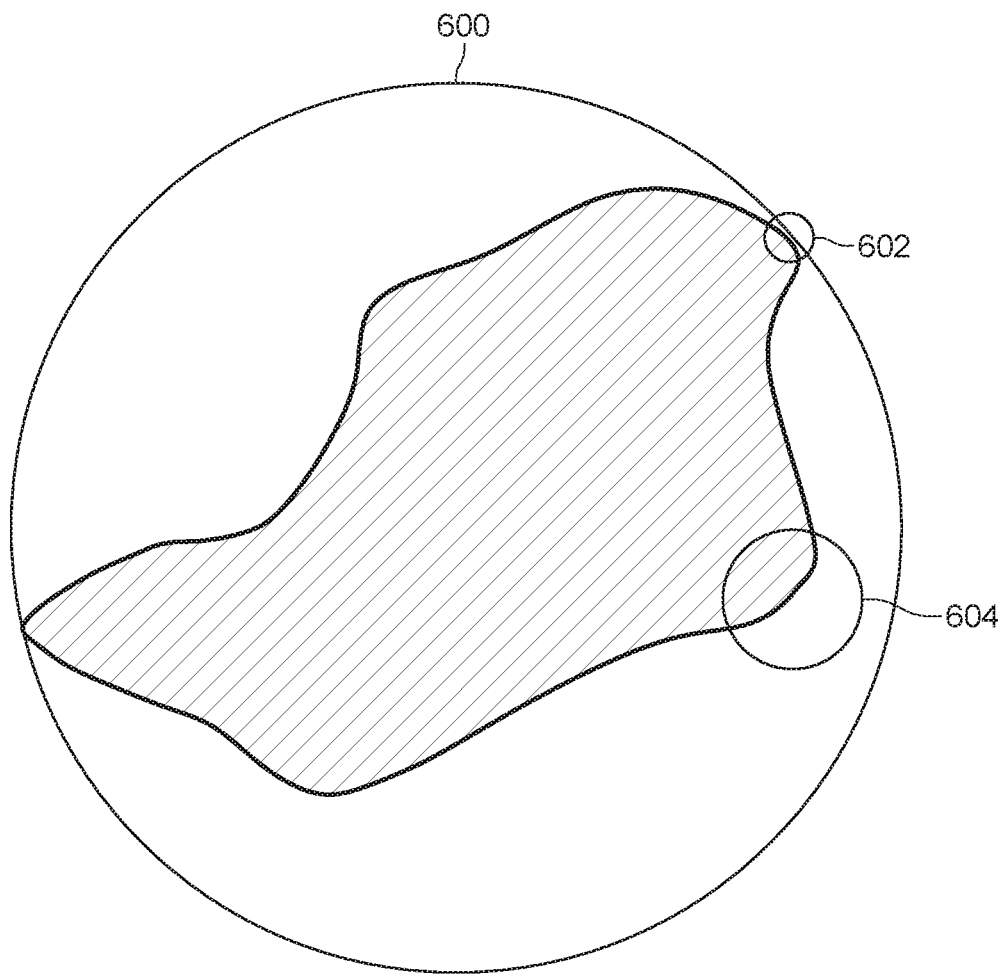
FIG. 6 illustrates particle shape descriptors at different scales.

A compilation of the various particle shape descriptors used in the art (see, Rodriguez, J., Johansson, J., and Edeskär, T. "Particle shape determination by two-dimensional image analysis in geotechnical engineering." Proc., Nordic Geotechnical Meeting: Sep. 5, 2012-Dec. 5, 2012, Danish Geotechnical Society, 207-218) include 19 different models and one can see that for the same physical parameter, there are many definitions and calculation approaches. These descriptors classify soils according to form 600, corner sharpness 602, and texture 604, as illustrated in FIG. 6, which correspond to the three important particle shape scales. The scale length is relative to the particle size. For example, form is approximately the same scale as the particle size (d/1), corner angularity is one order of magnitude less (d/10), and surface roughness is another order of magnitude less (d/100).

Figure 7A:
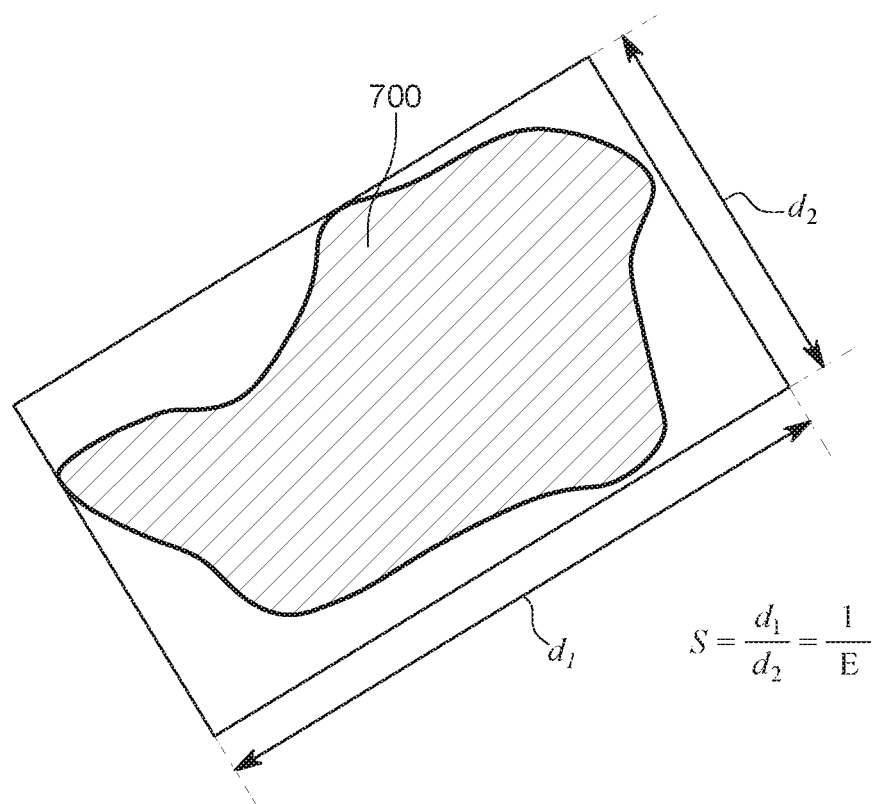
FIGS. 7A to 7C illustrate the roundness and sphericity of different coarse-grained sediment particles.
Figure 7B:
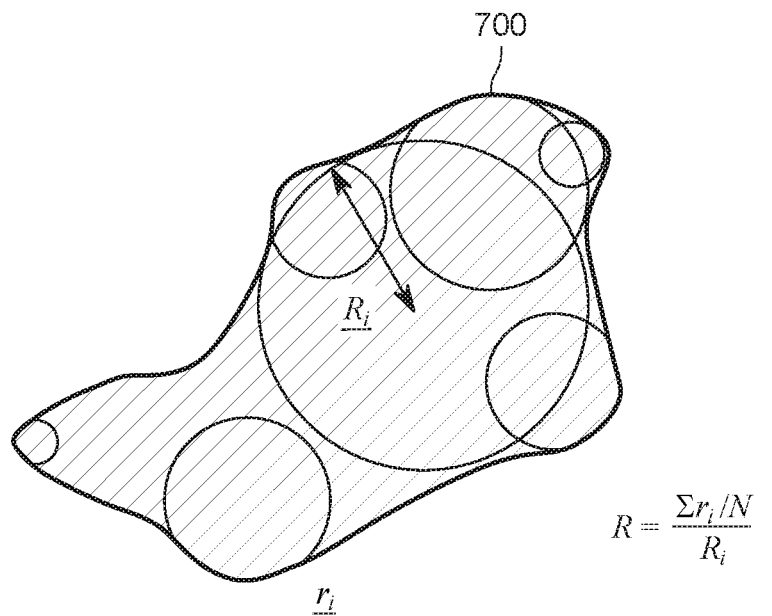
Figure 7C:
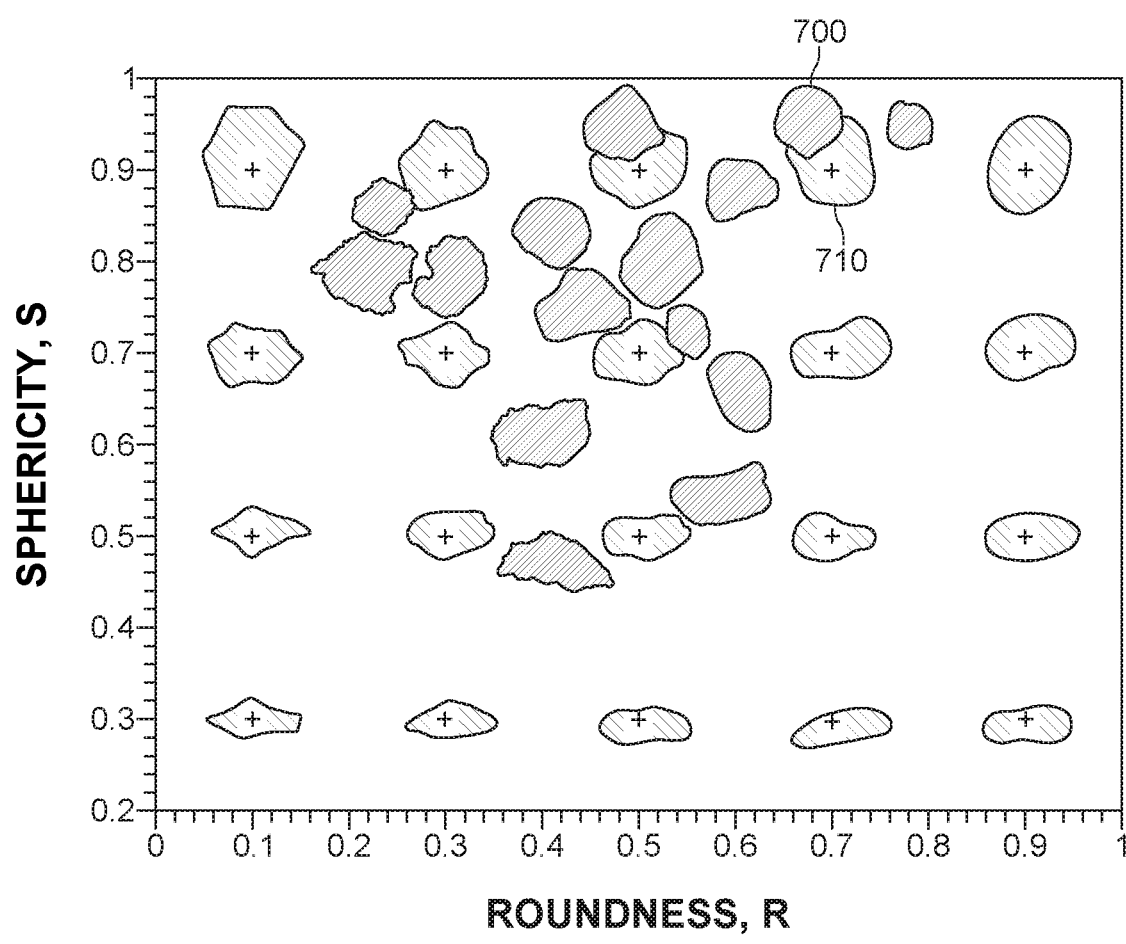

The shape parameter measurements used in this embodiment employed the images taken by the smartphone 212 attached to the 3D-printed microscope 210 illustrated in FIG. 2. These techniques automate conventional measurements of roundness and sphericity. FIGS. 7A-7B illustrate how the sphericity S and roundness R are calculated for a given coarse grain 700 while FIG. 7C show microscope images of the different coarse grains 700 and the binary images 710 (corresponding to the values S and R) superimposed on the coarse grains 700. The aspect ratio sphericity S and the roundness R are calculated using a known algorithm (see, Zheng, J., and Hryciw, R. (2015), "Traditional soil particle sphericity, roundness and surface roughness by computational geometry." Géotechnique, 65(6), 494-506). The algorithm uses a logical weighted regression and k-fold cross-validation to discretize the surface of the particle and remove the roughness for corner identification and circle fitting. The aspect ratio sphericity can also be computed using the ImageJ Analyze particles module with the measurement of "roundness" parameter. Sphericity, roundness and roughness form an independent set of particle shape parameters.

Roughness measurements are more complex to obtain in comparison to sphericity S and roundness R due to the fractal nature of this parameter and because there is no characteristic scale on the surface itself. The relevant observation length scale is the inter-particle contact area as described in Cho, G.-C., Dodds, J., and Santamarina, J. C. (2006), "Particle shape effects on packing density, stiffness, and strength: natural and crushed sands." Journal of Geotechnical and Geoenvironmental Engineering, 132(5), 591-602.

Based on these observations, the inventors believe that it is desired to select particle shape parameters that capture the frictional soil behavior together with automated measurements of roundness and sphericity. This will provide useful correlations for engineering practice. A systematic assessment of particle shape parameters can result in a better understanding of coarse-grained sediment behavior. Different shapes can promote alignment, which may lead to anisotropic behavior. Irregularity may also result in the locking in of porosity, which then impacts on packing density, compressibility, and stiffness.

Another feature that characterizes the coarse grains is the packing density. The mechanical response of sands depends on the physical nature and the state of the sand. The physical nature relates to the material or index properties such as grain size distribution, fines content, shape, and mineralogy. State parameters such as the relative density, effective stress, and fabric indicate the condition. The void ratio range ($e_{max}$ and $e_{min}$) combines the influence of grain sizes and shapes of all fractions that constitute a given soil.

Standard engineering procedures define the maximum and minimum void ratios $e_{max}$ and $e_{min}$ that represent terminal densities associated with the processes of load and vibration (ASTM D 4253), funneling, or scooping (ASTM D 4254). Several simplified procedures to determine $e_{max}$ include the placement of the sample into a mold covered by water and a simplified ASTM method using smaller specimen sizes and tilting. Other alternatives to the traditional minimum void ratio measurements (surcharges on a vibrating table—ASTM D4253) include underwater vibration, using a surcharge mass, tapping with a rubber hammer or using a graduated cylinder. Protocols suggested for fly ash characterization include Proctor compaction and formation under shear.

Sample measurements obtained using the ASTM standard undergo an acceleration of approximately 5 g (a=47 m/s²), a vibration of 0.5 mm amplitude and 50 Hz frequency with a surcharge of 14 kPa over 10 minutes that compacts the soil to the minimum void ratio (maximum density). High-energy vibrations can result in a higher risk of particle crushing, which will change the grading curve of the sand. Recent studies have suggested the development of new standards for the robust determination of minimum void ratios without grain crushing.

A known mathematical approach uses a grain size distribution and the dimension reduction concept to estimate the minimum and maximum void ratios. It assumes that the grains are 3D spheres than can be mapped as 1D rods and the rods can be mapped in a void space to optimize the ordering and the gaps for the packing rods. The model corresponds to an ideal case and is considered to be a first order approximation.

The critical state fabric that develops at the large shear strain does not resemble the soil fabric, which forms during $e_{max}$ (funneling) or $e_{min}$ (compaction and vibration). However, similar particle shape characteristics control the stability of the material at the particle level. Therefore, there is an expectation of correlations between the critical state parameters, the particle shape, and the packing densities.

Previous studies have reported that void ratios obtained from repetitive loading cycles are lower than $e_{min}$. The highest densification of granular materials uses cyclic shearing with small amplitudes under constant pressure. If performed after a static compression, the minimum void ratio is reached asymptotically by straining the soil to the smallest void ratio in each cycle, before the initiation of dilation at the characteristic state. The strain level of the minimum void ratio decreases with the density as the number of cycles increases. An optimal densification requires continuous monitoring and feedback control. Hypoplastic constitutive models have implemented this successfully.

Maximum and minimum void ratios are semnificative parameters for computations of the relative density in coarse-grained sediments. The relative density works as a reference to describe the state of the sand, and is particularly relevant for laboratory testing programs. Since these ratios are procedural methods used to obtain a terminal state fabric, they provide information about soil behavior in response to specific processes. For example, the minimum void ratio is relevant for compaction and soil improvement, while the maximum void ratio is useful for powder technology and pile deposition. Traditional methods that assess the liquefaction potential of soils typically use the relative density computed with standard minimum void ratio procedures. However, the methodology does not resemble the same shear process.

Figure 8A:
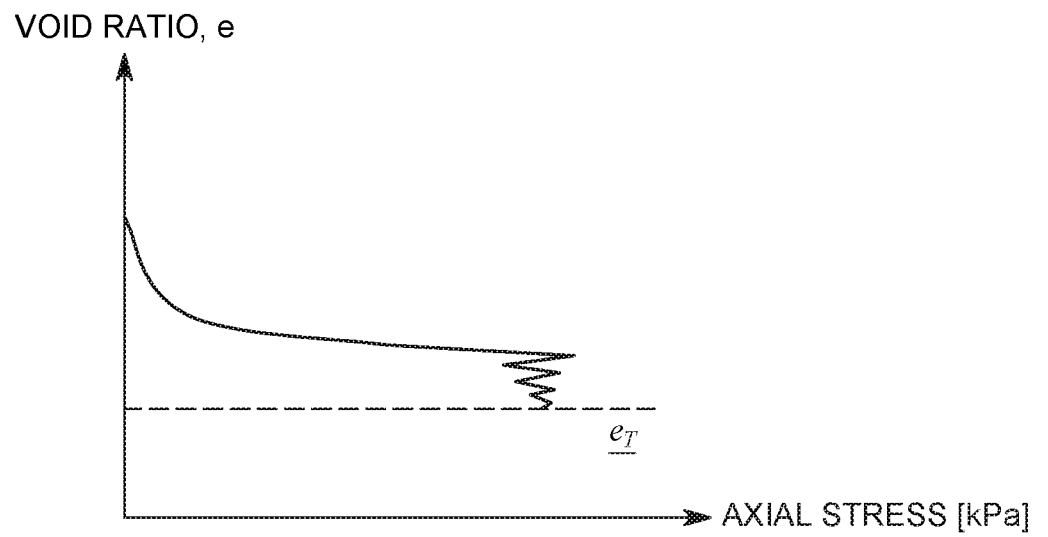
FIGS. 8A and 8B illustrate the change in the void ratio and the shear strain, respectively, when the granular material is experiences a repetitive loading.
Figure 8B:
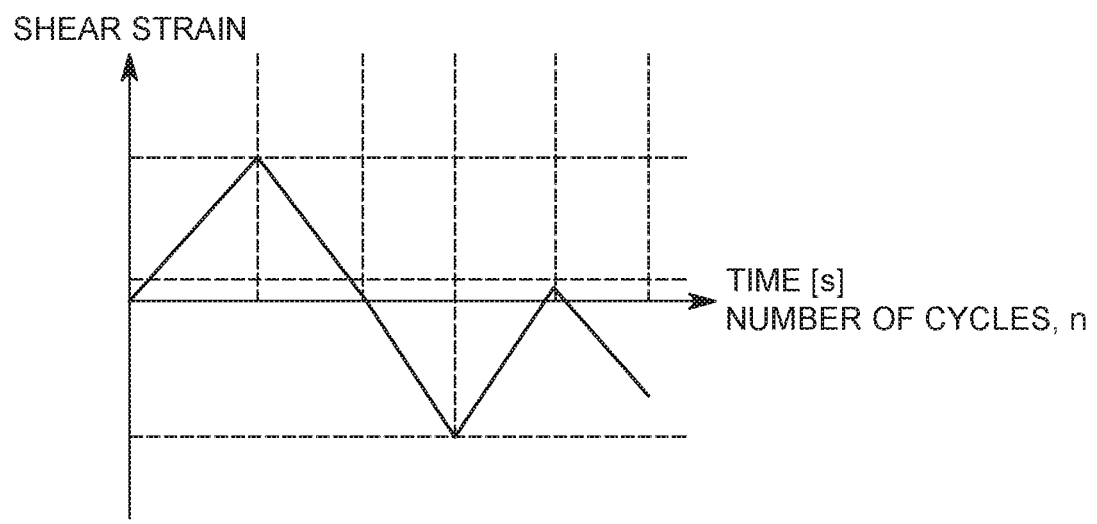
Figure 8C:
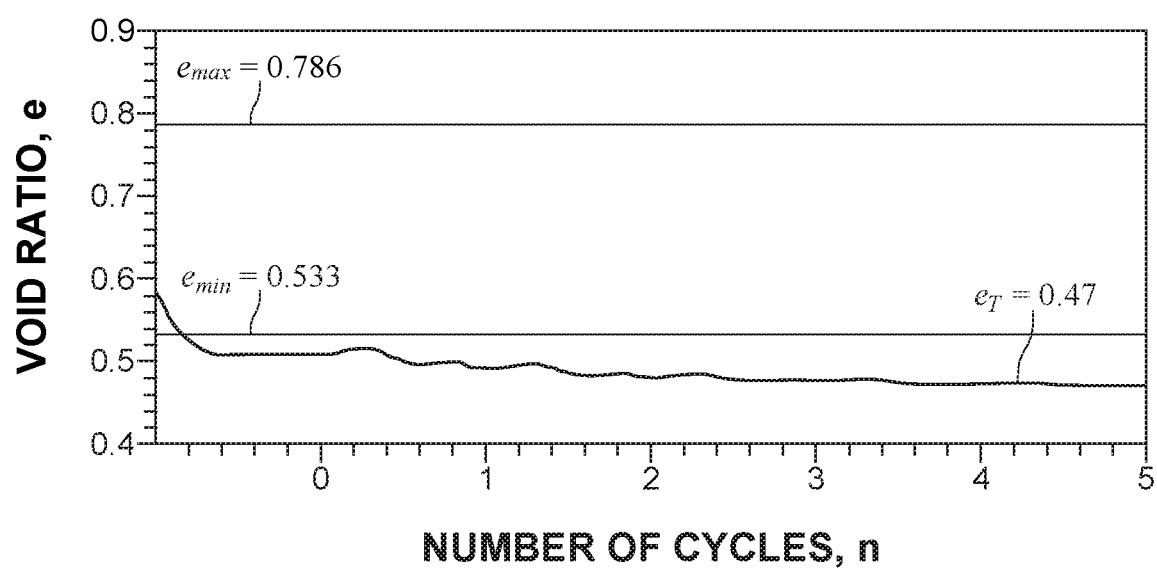
FIG. 8C illustrates the minimum void ratio results obtained from simple cyclic shear tests of the granular material.

Thus, in this embodiment, the inventors have tried to obtain the minimum void ratio using a cyclic shear applied to a dry sample with a simple shear device. After a static compaction phase, a cyclic shear phase has been applied and the shear strain amplitude was reduced for every cycle. FIGS. 8A and 8B illustrate a repetitive loading test with changes in the shear strain amplitude. More specifically, FIG. 8A presents the void ratio e versus the axial stress, and FIG. 8B presents the shear strain versus the time t and the number of cycles n. The plot in FIG. 8B shows how the sample compacts and the void ratio decreases with time, until it reaches a plateau, which is described by the terminal void ratio $e_T$. FIG. 8C shows the evolution of the void ratio over time using a cyclic simple shear. Note that the void ratio over time is bounded by the minimum and maximum $e_{max}$ and $e_{min}$, respectively.

A limitation of this method is the difficulty in obtaining accurate calculations of the initial void ratio as a function of the height and density of the specimen. In a small sample, a change in the order of tens of μm can lead to different initial void ratios and therefore, it results in different final void ratios (d=64 mm, Δh=1 mm, Δe=0.02).

Previous work in this field recognized the difficulty of determining the true minimum and maximum densities. The $e_{max}$ and $e_{min}$ are not two extreme void ratios, but rather they are void ratios at the loosest and densest state produced by a certain set of laboratory test procedures. These ratios are not unique and depend on the test procedures. The minimum void ratio determined by cyclic simple shear is closer to the true minimum, but it is harder to identify due to the previously explained limitations.

The experiments performed by the inventors measured $e_{min}$ using the tapping method and $e_{max}$ using the funneling under zero deposition height conditions and follow the Japanese Geotechnical Society (JGS) standard. JGS standards for sands can provide consistent and repetitive results for high fines contents, of up to 30%, and do not induce particle crushing. Strong correlations between $e_{max}$ and $e_{min}$ in natural sands validate these results.

In general, packing densities can capture the influence of size and shape in a single measurement. These densities reflect the formation history and depend on the particle size ratio and the volumetric fraction of the fines. Since they reflect the fact that different terminal densities develop under specific procedures, these measurements can lead to estimates of mechanical parameters like shear strength and compressibility.

The angle of repose is another parameter that was studied by the inventors. Strength parameters are a fundamental part of the engineering design and the angle of repose is related to them. Conventional triaxial tests for determining the strength parameters are time-consuming and expensive. The angle of repose is a simple measurement of the critical state friction angle of sands. The static angle of repose reflects the ultimate strength of the sand, as recognized in the art. The boundary conditions influence the soil shear strength and result in restrictions on the particle motion at the contact level. The angle of repose measurements, which show that the internal angle of repose is larger than the external angle illustrate this phenomenon [1]. Isotropic consolidation at the loosest state (upper bound: $e_{max}$) and densest state (lower bound: $e_{min}$) provide boundaries for the critical state line.

Most of the commercially available devices that measure the angle of repose use 3D configurations with funneling deposition and stacking under the funnel. However, this technique only measures the external slope. However, measurements of both the external and internal slopes result in different angles of repose. This is due to the internal anisotropy of the friction angle. Higher friction angles mobilize in axial extension rather than in axial compression.

A three-dimensional space with the axes of effective confinement, deviatoric load, and volume, defines the load-deformation behavior in granular materials. The critical state captures the large strain behavior in terms of shear stress $q=(\sigma_1-\sigma_3)$, mean effective $p'=(\sigma_1+2\sigma_3)/3$ and void ratio e. The critical state line is located in the e-p'-q space as discussed in Muir Wood, D. (1991), Soil Behaviour and Critical State Soil Mechanics, or Roscoe, K. H., Schofield, A. N., and Wroth, C. P. (1958), "On The Yielding of Soils." *Géotechnique,* 8(1), 22-53, or Schofield, A., and Wroth, C.

(1968), Critical State Soil Mechanics. Two competing volume change tendencies, dilation and contraction, reach equilibrium at large strains. Granular materials (dense and loose states) shear at a constant volume and reach the critical state.

The critical state line projection on the p'-q space defines the strength parameter M, which corresponds to the critical state friction angle and linear Coulomb strength model. The strength parameter M for axial compression is defined as:

$$M = \frac{q_{cs}}{p'_{cs}} = \frac{6\sin\phi_{cs}}{3 - \sin\phi_{cs}}$$

where $\varphi$ is the angle of internal friction.

The critical state line projection onto the e-p' space follows a semi-logarithmic trend and is defined by the slope $\lambda$ and the intercept $\Gamma$ as follows:

$$e_{cs} = \Gamma - \lambda \log\left(\frac{p'}{1 \text{ kPa}}\right).$$

Figure 9A:
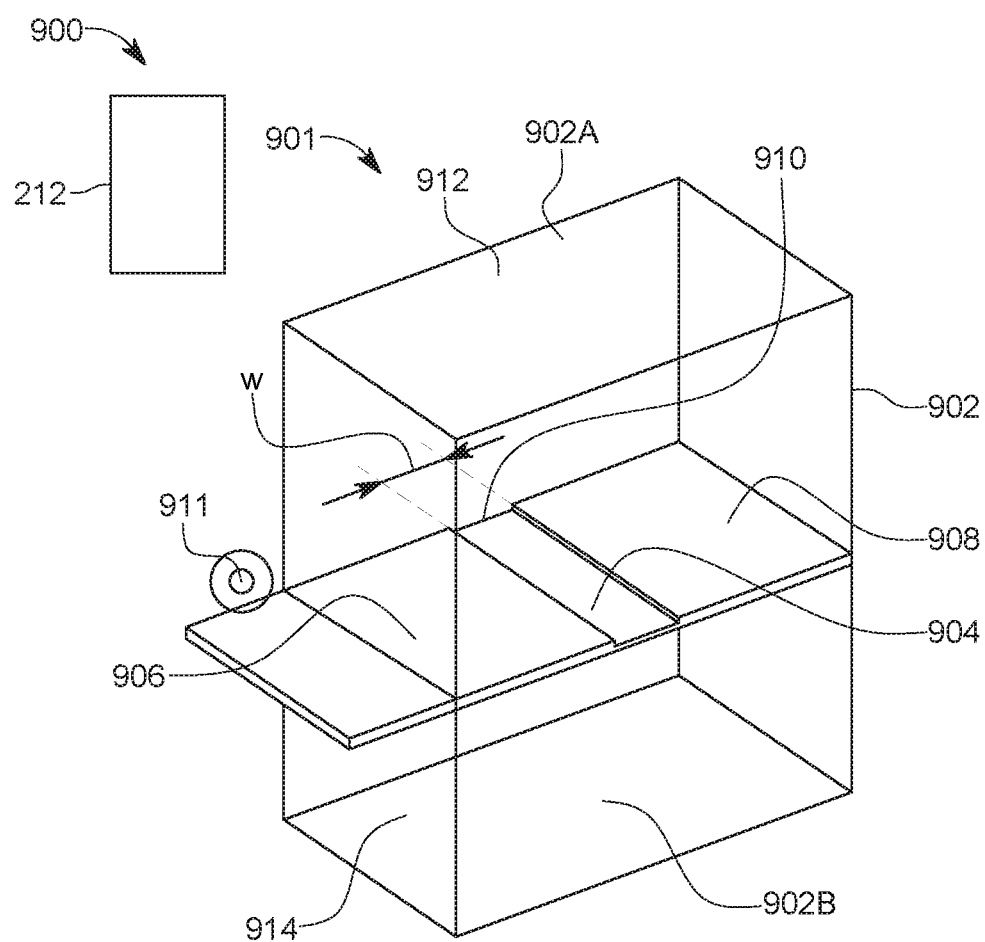
FIG. 9A shows an angle of repose device.
Figure 9B:
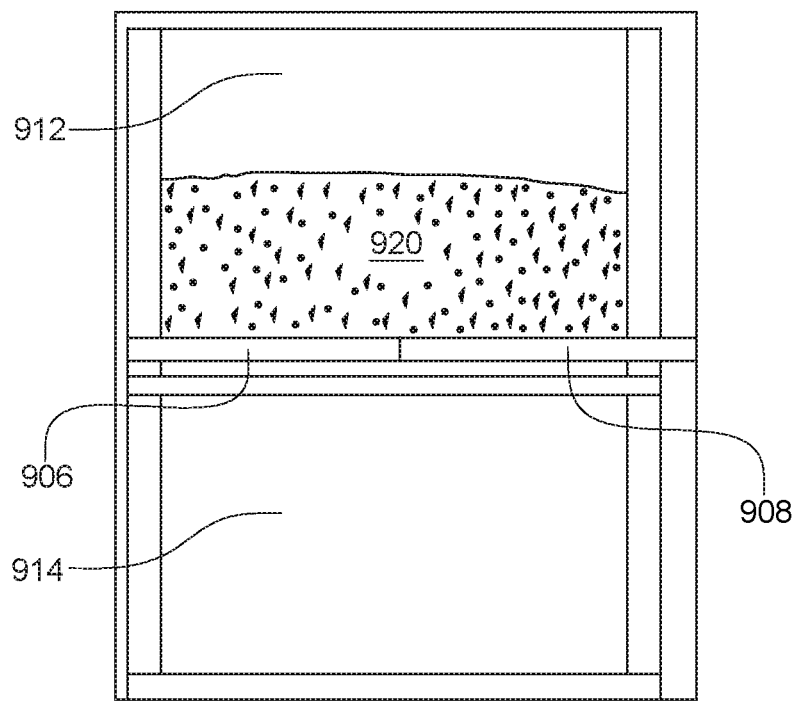
FIGS. 9B and 9C illustrate the granular material placed inside the angle of repose device before and after forming the gap, respectively.

A device for measuring the angle of repose with an improved accuracy is now discussed with regard to FIGS. 9A to 9E. FIG. 9A shows an angle of repose system 900 that includes an angle of repose device 901 and a smartphone 212. The angle of repose device 901 includes a transparent box 902, for example, made of plexiglass, but other transparent materials may be use. In one embodiment, only a side wall of the box is transparent so that the smartphone 212 can take a picture of the interior of the box. The box 902 has a rectangular geometry in this embodiment. However, the box may have other geometries. This design allows a granular material (not shown in this figure) to pass through a slit 904, which is formed between two plates 906 and 908. One of the two plates may be a sliding plate 906 so that it creates the slit 904 for a discharge of the granular material. Note that the two plates 906 and 908 are supported by a frame 910, which is attached to the inside of the box 902, between the top side 902A and the bottom side 902B of the box 902. In one embodiment, the two plates 906 and 908 form an upper chamber 912 and a lower chamber 914 in the box 902 and the granular material 920 is placed in the upper chamber 912, as shown in FIG. 9B. In one application, the frame is placed at the half height of the box 902 and the top part of the box is open or has an opening for placing the granular material 920 on top of the first and second plates 906, 908. The frame may be implemented as rails. A motor 911 may be connected to one of the plates, for example plate 906, to move this plate with a desired distance away from the other plate 908.

Figure 9C:
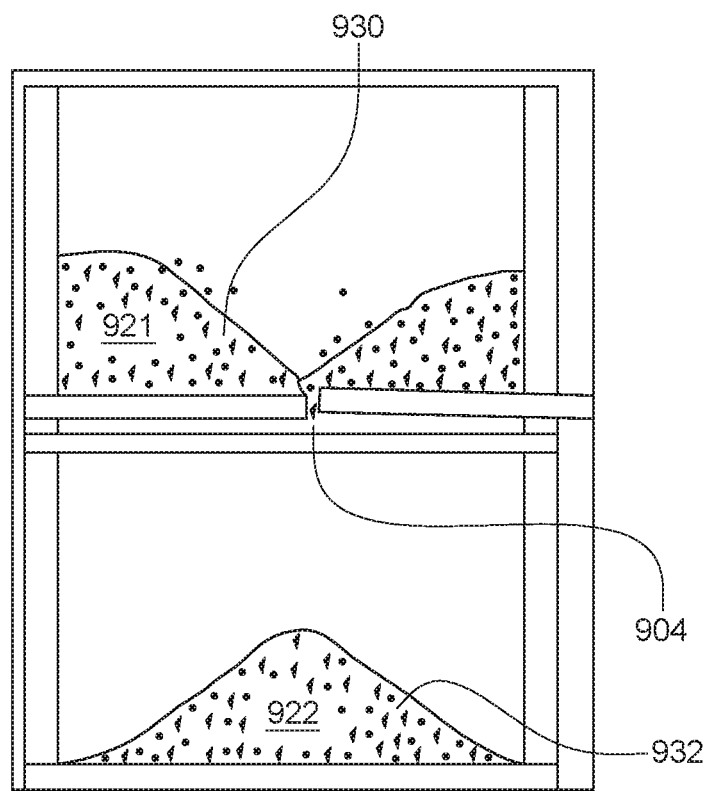

The sliding plate 906 may be moved with the desired distance to generate the slit 904. A computing device may be used to control the motor 911. In one application, the motor 911 includes a transceiver for communicating in a wireless manner with the computing device. The computing device may be smartphone 212. Thus, in this implementation, the user of the smartphone 212 may input into an app the desired width of the slit 904, and transmit this information to the motor 911, which effectively moves the sliding plate 906 to achieve this width. Following the formation of the slit 904, the granular material 920, which is stored in the upper chamber 912, is partially discharged into the lower chamber 914, as illustrated in FIG. 9C. The granular material 920 that is left in the upper chamber 912, called herein the first part 921, forms an internal slope 930, while the granular material 922 that was discharged into the lower chamber 914 forms an external slope 932, as also shown in FIG. 9C.

Figure 9D:
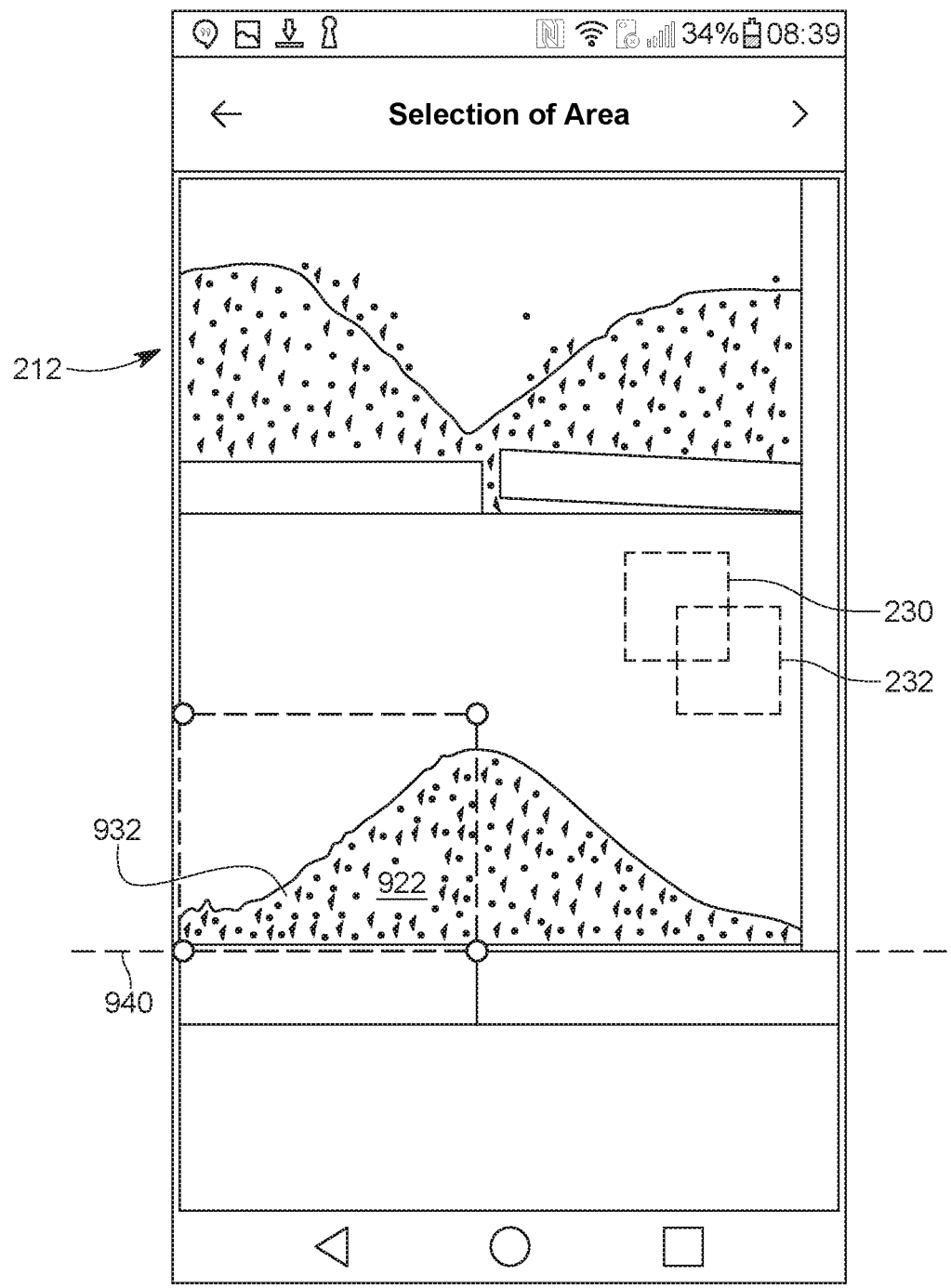
FIG. 9D illustrates images taken with a smartphone of the external and internal slopes of a sand used in the angle of repose device.

The angle of repose measurements (i.e., both internal and external slopes) involve taking a digital picture (for example, a first digital picture 230 of the upper chamber and a second digital picture 232 of the lower chamber, and the digital images are stored in the memory 218 illustrated in FIG. 2A) of the slopes with the smartphone 212, and computing the angle between the sand and a horizontal line 940. The horizontal line 940 may be a reference line drawn on the box 902 as a reference line. In one application, the horizontal line 940 is automatically aligned with a true horizontal, which is determined by the app based on one or more internal sensors (e.g., accelerometers) of the smartphone. FIG. 9D shows the image of the discharged granular material 922 visible on the screen of the smartphone 212 and FIG. 9E shows the external slope 932 of the discharged granular material 922 automatically identified by the app 960 running on the smartphone 212.

Figure 9E:
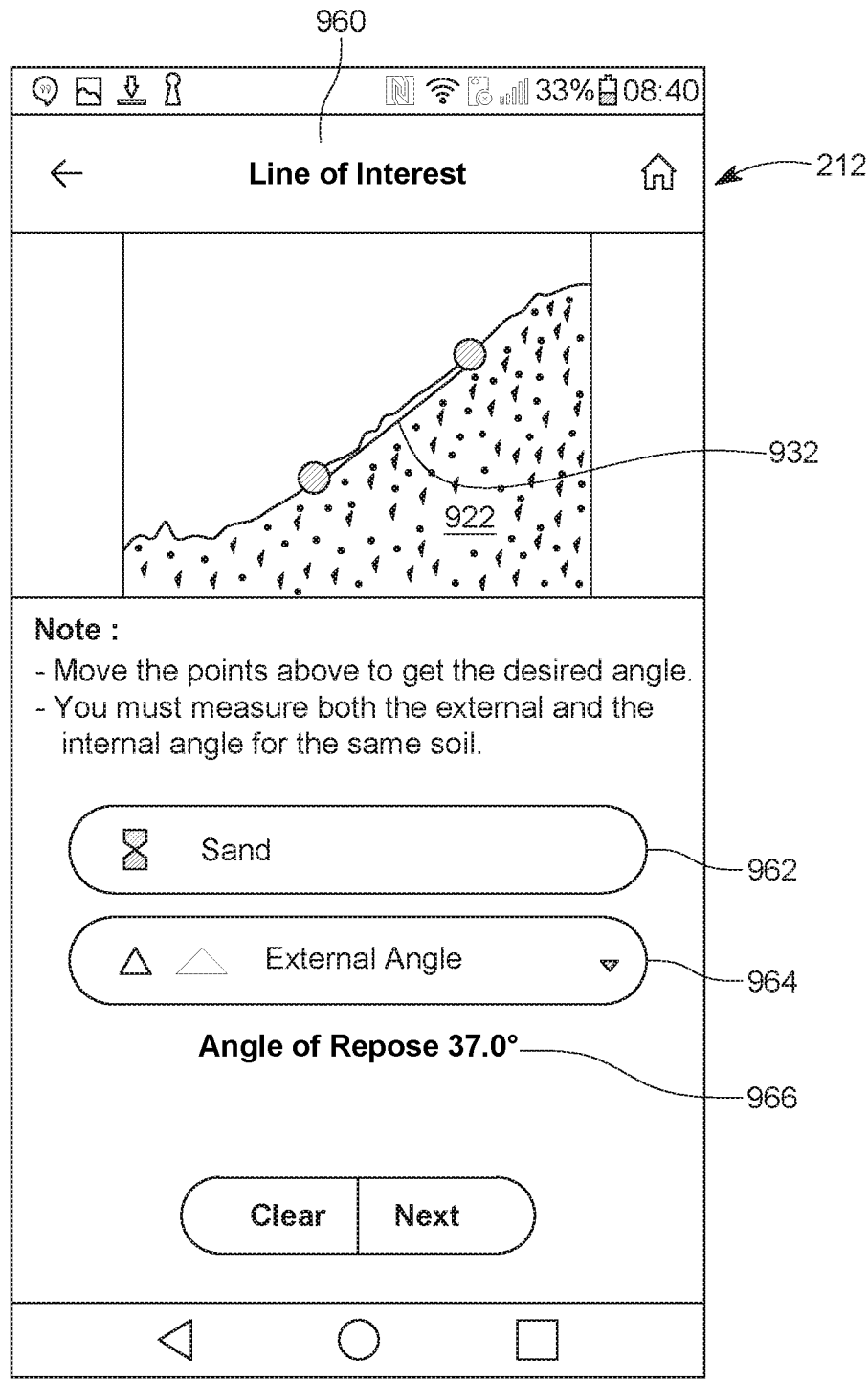
FIG. 9E is a view of an app running on the smartphone and illustrating the slope associated with a part of the sand.

The custom design mobile app 960 is shown in FIG. 9E having an input field 962 in which the user can enter the type of the granular material 920, which in this case is sand. The app 960 further has a field 964 in which the user can select the external slope, the internal slope, or other desired parameter to be calculated. In still another field 966, the app shows the calculated angle. Other input and output fields may be added to the application. The app calculates the angle of repose using images 230 and 232 of the slopes taken with the smartphone's camera. The app 960 computes the slopes or angles based on the pixel distance and trigonometric relationships, saves the measured values in an internal memory, and allows the calculations of several values to obtain a variety of statistics associated with the angle of repose.

The measurement of the friction, which is determined from the angle of repose, intimately relates to boundary conditions. The angle of repose cannot be measured for smooth spherical particles placed on a polished base because those particles will roll away. However, the same spherical particles will readily form a pile on a corrugated base.

Figure 10:
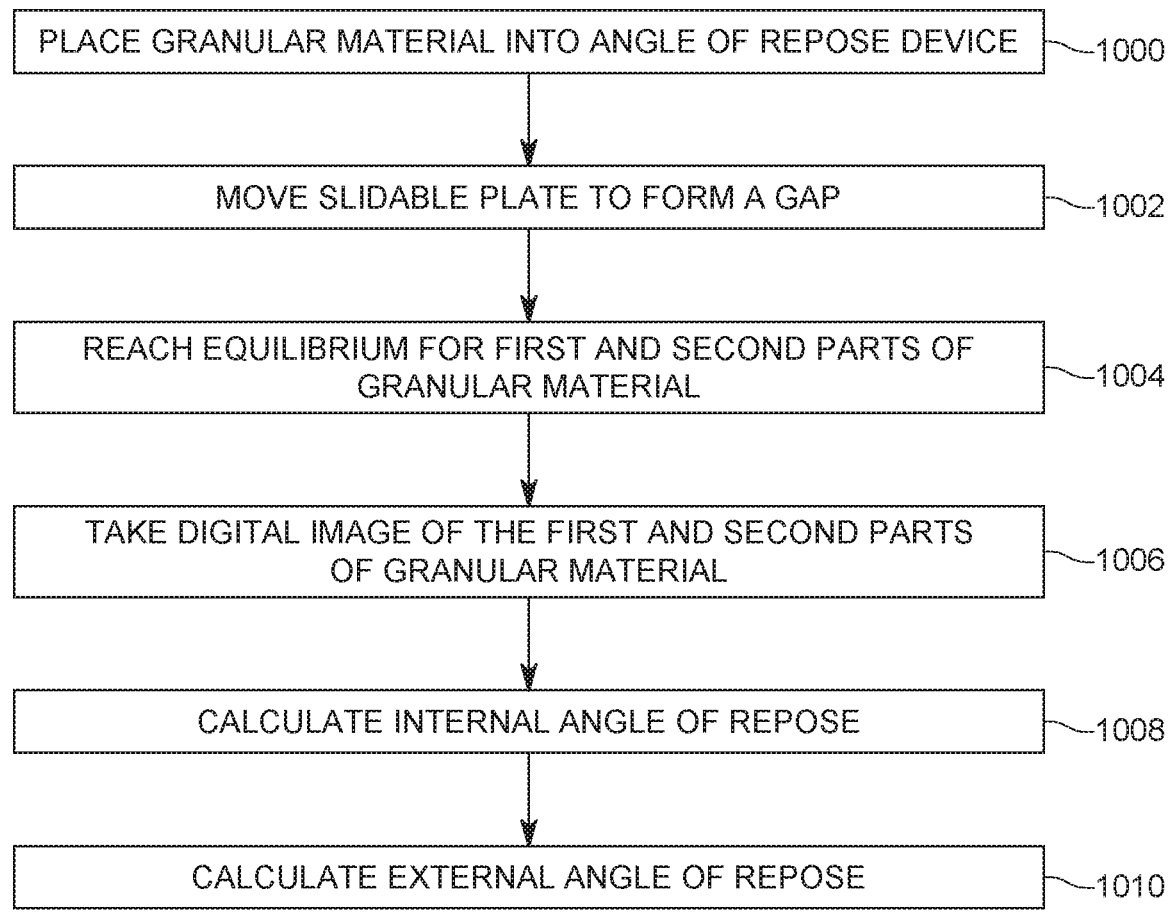
FIG. 10 is a flowchart of a method that can be implemented in an app on a smartphone for quickly and accurately measuring the internal and external angles of repose of the granular material.

A method for measuring the angle of repose is now discussed with regard to FIG. 10. The method starts in step 1000, in which a granular material 920 is added to the angle of repose device 901. In this step, the two plates 906 and 908 are closed, so that there is no gap 904 between them, and the entire granular material 920 is present in the upper chamber 912. In step 1002, the slidable plate 906 is moved a desired distance d, to generate the gap 904. The width w of the gap 904 is the same with the distance d. In one application, the motor 911 may control the movement of the slidable plate 906, for generating the gap 904. While the slidable plate 906 may be moved manually, if moved by the motor 911, the smartphone 212 (which is a smart portable device) may control the width of the gap 904. In other words, the process is automated so that the user of the smartphone 212 controls the size of the gap 904 from the smartphone.

In step 1004, the first part 921 of the granular material 920 is at equilibrium in the upper chamber 912 while the second part 922 of the granular material is at equilibrium in the lower chamber 914. The second part 922 has fallen through the slit 904 due to the gravity. The first part 921 forms a first slope 930 while the second part 922 forms a second slope 932.

In step 1006, the camera 214 of the portable smart device 212 is used to take a digital image 230, 232 of the first part 921 and the second part 922 of the granular material 920. For this reason, at least one wall of the box 902 is transparent, as illustrated in FIG. 9B. The app 960, which is installed on the processor 216, calculates in step 1008 an internal angle of repose (see slope 930) and in step 1010 an external angle of repose (see slope 932). The app further extracts from the digital image the internal and external angles of repose. In one application, the app aligns the horizontal line 940 in the digital image with a true horizontal.

Figure 11:
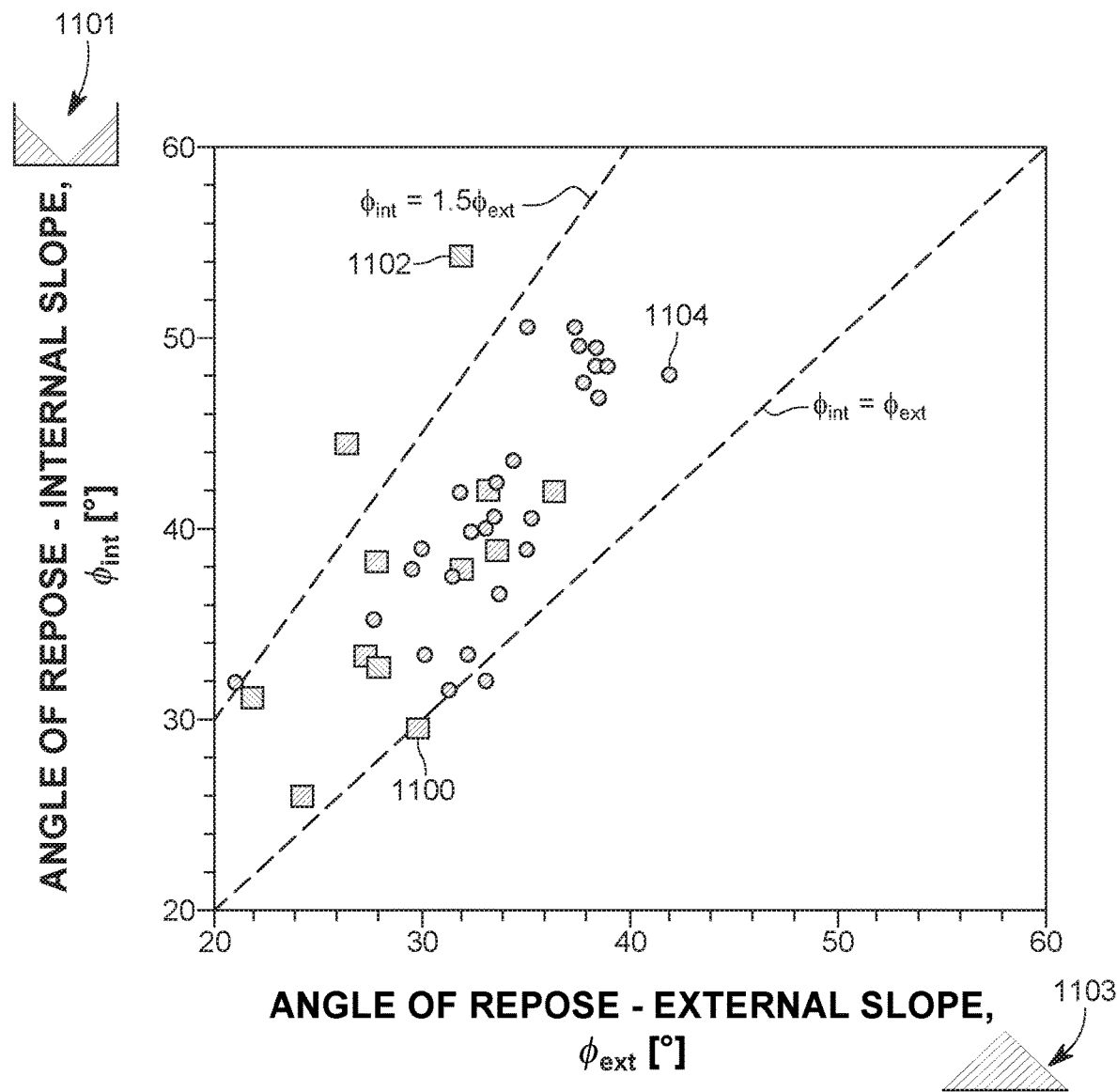
FIG. 11 shows the external versus the internal angle of repose calculated with the app illustrated in FIG. 9E.

The results of this method show in FIG. 11 the friction anisotropy in natural sands. The figure shows the measured data 1100 associated with the internal angle of repose 1101, the external data 1102 associated with the external angle of response 1103, and the existing data 1104 for the traditional angle of repose. The angle of repose measured on the internal slope is larger than the measurement obtained from the external slope. Sliding particles come closer together in the internal slope, and the inter-particle coordination in the annular direction increases. By contrast, on the outer slope, the sliding particles move away from each other and the coordination number decreases. Different failure mechanisms, such as axial compression and lateral extension, resemble these micro-processes.

On average, angular soils exhibit a higher friction coefficient M than rounded soils, in agreement with previous studies. Mineralogy and mean particle size do not appear to significantly influence the M strength parameter. In general, the eccentricity of the grains, which is the opposite to the sphericity, promotes particle alignment during shear (diatom pellets). The angularity of the grains, which is the opposite of the roundness, fosters interlocking and hinders particle rotation with roughness involved in the generating surface friction.

Based on these measurements, Table 2 in FIGS. 12A and 12B shows a summary of all test results. The relative particle size (measured by the coefficient of uniformity) and the particle shape determine the fabric formation in coarse-grained sediments (packing densities). Well-graded sediments made of rounded particles tend to pack at a higher density than poorly graded sediments made of angular particles. The variation of the packing densities $e_{max}$ and $e_{min}$ with fines content shows that there is a decrease in the void ratio due to the void filling, which reaches a minimum level and then increases with fines content until the highest value due to the replacement of solids. Packing densities $e_{max}$ and $e_{min}$ increase as the roundness and sphericity decrease. Correlations between the packing densities, particle shape and the coefficient of uniformity obtained from an extensive soil database and results from these experiments agree with these trends. These results are relevant for hydraulic conductivity, fines migration, and filter formation.

The small strain stiffness of a soil reflects the nature of the inter-particle contacts and the shear wave velocity is non-linear and stress-dependent, as illustrated by equations $$G_{max} = \rho V_s^2 \text{ and } V_s = \alpha \left( \frac{\sigma'}{1 \text{ kPa}} \right)^\beta,$$

where α is the shear wave velocity at 1 kPa, and the β factor reflects the sensitivity to the mean effective stress. In general, an irregularity (a combination between eccentricity and angularity) produces lower stiffness (lower α) and higher stiffness sensitivity to the state of stress (higher β). These factors also lead to higher compression and decompression indices. Correlations between the compressibility parameters (Cc, Cr, and $e_{1\ KPa}$), packing densities, and particle shape support these observations and have implications for compressibility, stiffness, and deformation.

Irregularity hinders particle mobility and their ability to attain dense packing configurations. Eccentricity, angularity, and roughness reduce particle rotation, enhance dilatancy, and the evolution of anisotropy. These factors might also cause interlocking between grains and hinder grain rotation. In addition, these mechanisms lead to correlations between the three critical state parameters λ, Γ and $\varphi_{CS}$, which decrease with increasing the roundness and sphericity. Previous studies report correlations between the intercept F and the minimum void ratio $e_{min}$ for non-plastic soils. The slope λ increases with $e_{min}$ and $e_{max}$. The potential contractibility at critical state decreases for soils with low $e_{min}$. There was no correlation observed between packing densities and the angle of repose. These factors all have implications for shear strength behavior.

The embodiments discussed herein indicate that image analysis techniques can accurately measure the particle size and shape of coarse-grained soils. Different computation methods can determine important shape parameters such as sphericity, roundness, and roughness. The packing densities of $e_{max}$ and $e_{min}$ correspond to terminal void ratios in a variety of soil fabrics and are process dependent. The angle of repose is a reasonable estimate for the critical state friction angle of sands. The external and internal angles correspond to upper and lower bounds, which relate to different failure mechanisms such as axial compression and lateral extension that are present in typical engineering applications such as bearing capacity, retaining walls, and excavations.

The disclosed embodiments provide an angle of repose measurement device that is capable, when used with an app that runs on a smart device, to automatically calculate an internal angle of repose and an external angle of repose. The internal and external angles of repose correspond to the upper and lower bounds of the angle of repose and they correspond to different failure mechanisms. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] Santamarina, J., and Shin, H. (2009), "Friction in granular media." Meso-Scale Shear Physics in Earthquake and Landslide Mechanics, Hatzor, Y H, Sulem, J., Vardoulakis, I. (eds.), 157-188.

What is claimed is:

1. A system for measuring an angle of repose, the system comprising:
   an angle of repose device that holds a granular material; and
   a portable smart device having a camera and a processor,
   wherein the angle of repose device is configured to slide a first plate relative to a second plate to open a slit between the first and second plates, to allow a first part of the granular material to remain in an upper chamber while a second part of the granular material moves freely, due to gravity, from the upper chamber to a lower chamber, and
   wherein the portable smart device uses the camera to take a digital image of the first part and the second part of the granular material and uses an app installed on the processor to calculate an internal angle of repose and an external angle of repose.

2. The system of claim 1, wherein the angle of repose device comprises:
   a box having at least one wall that is transparent;
   a frame attached to an inside of the box;
   the first plate, which is slidable located on the frame; and
   the second plate, which is fixedly located on the frame.

3. The system of claim 2, wherein the first plate and the second plate separate the box into the upper chamber and the lower chamber.

4. The system of claim 2, further comprising:
   a motor configured to move the first slidable plate.

5. The system of claim 4, wherein the portable smart device controls a movement of the first slidable plate.

6. The system of claim 1, wherein the app extracts from the digital image a slope of the first part of the granular material and calculates the internal angle of repose.

7. The system of claim 6, wherein the app further extracts from the digital image a slope of the second part of the granular material and calculates the external angle of repose.

8. The system of claim 1, wherein the app aligns a horizontal line in the digital image with a true horizontal.

9. An angle of repose device for measuring an angle of repose, the device comprising:
   a box that holds a granular material; and
   a first plate that is configured to slide relative to a second plate and open a slit between the first and second plates, to allow a first part of the granular material to remain in an upper chamber while a second part of the granular material moves freely, due to gravity, from the upper chamber to a lower chamber,
   wherein the first part of the granular material forms a first slope that corresponds to an internal angle of repose and the second part of the granular material forms a second slope that corresponds to an external angle of repose.

10. The device of claim 9, further comprising:
    the box having at least one wall that is transparent;
    a frame attached to an inside of the box;
    the first plate is slidable located on the frame; and
    the second plate, which is fixedly located on the frame.

11. The device of claim 10, wherein the first plate and the second plate separate the box into the upper chamber and the lower chamber.

12. The device of claim 10, further comprising:
    a motor configured to move the first slidable plate.

13. The device of claim 12, wherein a portable smart device controls a movement of the first slidable plate.

14. The device of claim 9, wherein the granular material is sand.

15. A method for measuring an angle of repose, the method comprising:
    placing granular material inside an angle of repose device;
    forming a slit in a support of the granular material, wherein the support is made of first and second plates, and the first plate is configured to slide relative to the second plate to form the slit;
    allowing a first part of the granular material to remain in an upper chamber while a second part of the granular material moves freely, due to gravity, from the upper chamber to a lower chamber;
    taking a digital image of the first part and the second part of the granular material;
    calculating an internal angle of repose for the first part; and
    calculating an external angle of repose for the second part.

16. The method of claim 15, further comprising:
    determining with an app, installed on a portable smart device, a first slope associated with the first part and a second slope associated with the second part; and
    calculating the internal angle of repose from the first slope and calculating the external angle of repose from the second slope.

17. The method of claim 15, wherein the steps of taking a digital image and calculating the internal and external angles of repose are performed with a smartphone.

18. The method of claim 15, wherein the angle of repose device comprises:
    a box having at least one wall that is transparent;
    a frame attached to an inside of the box;
    the first plate, which is slidable located on the frame; and
    the second plate, which is fixedly located on the frame,
    wherein the slit is formed by moving the first plate away from the second plate.

19. The method of claim 18, wherein the first plate and the second plate separate the box into the upper chamber and the lower chamber.

20. The method of claim 15, wherein an app aligns a horizontal line in the digital image with a true horizontal.

* * * * *